United States Patent
Matthews, Jr.

(10) Patent No.: US 6,259,435 B1
(45) Date of Patent: Jul. 10, 2001

(54) OBFUSCATED KEYBOARD SCAN

(75) Inventor: Donald P. Matthews, Jr., Morgan Hill, CA (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/139,885

(22) Filed: Aug. 25, 1998

(51) Int. Cl.⁷ ....................................... G09G 5/00
(52) U.S. Cl. .................. 345/172; 345/174; 178/18.01; 178/19.01
(58) Field of Search .................... 345/172, 173, 345/168, 169, 100, 174, 179; 178/17 C, 18.01, 18.03, 18.05, 18.06, 18.07, 19.01, 19.03, 19.04; 340/365

(56) References Cited

U.S. PATENT DOCUMENTS

| | | | |
|---|---|---|---|
| 3,836,726 | * | 9/1974 | Well et al. .............................. 179/41 |
| 4,007,459 | * | 2/1977 | Hagelbarger ......................... 340/365 |
| 4,587,519 | * | 5/1986 | Munetsugu et al. ................. 340/711 |
| 5,583,527 | * | 12/1996 | Fujisaki et al. ........................ 345/55 |

* cited by examiner

Primary Examiner—Bipin Shalwala
Assistant Examiner—Mansour M. Said
(74) Attorney, Agent, or Firm—Leah Sherry; Justin Boyce; Oppenheimer Wolff & Donnelly LLP

(57) ABSTRACT

A keyboard input device includes a processor repeatedly executing a scan routine to detect key press events while masking the events from an external monitoring means. The keyboard input device has a number of finger-activatable keys, each connected at the intersection of row signal lines and column signal lines, which are in turn connected to the processor. The processor systematically activates the rows and randomly activates the columns. A key press event causes the key's associated row and column to create a closed switch. The processor monitors the columns for a signal forced on pairs of rows. Obfuscating signals forced onto the columns inhibit detection of the key press event signals by an external source.

27 Claims, 9 Drawing Sheets

KEY RELEASE AND DEBOUNCE

PRIOR ART

FIG. 1

PRIOR ART

PRIOR ART

FIG. 4

CYCLE NUMBER     500

|        | Cycle 0 | Cycle 1 | Cycle 2 | Cycle 3 |
|--------|---------|---------|---------|---------|
| ROW 0  | X       |         | X       |         |
| ROW 1  | X       | X       |         |         |
| ROW 2  |         |         | X       | X       |
| ROW 3  |         | X       |         | X       |

| 4-Cycle Scan Routine | Rows Forced per Cycle | |
|----------------------|-----|-----|
| CYCLE 0              | R0  | R1  |
| CYCLE 1              | R1  | R3  |
| CYCLE 2              | R0  | R2  |
| CYCLE 3              | R2  | R3  |

KEY DETECT PHASE

FIG. 8

KEY DETECT DEBOUNCE

FIG. 9

KEY SCAN

*FIG. 10*
KEY RELEASE AND DEBOUNCE

OBFUSCATED KEYBOARD SCAN

BACKGROUND OF THE INVENTION

The present invention relates generally to keyboard input devices, and more particularly to a method, apparatus and computer program product to obfuscate keyboard signals.

Keyboard input devices are widely used as an interface through which a user can input units of information to a computer system or database. Examples of keyboard input devices are a keypad entry system for use with bank automated teller machines (ATMs), credit card entry and verification devices, cash machines at grocery store checkout lines, or a keyboard peripheral device for use with personal computer systems.

Figure 1:
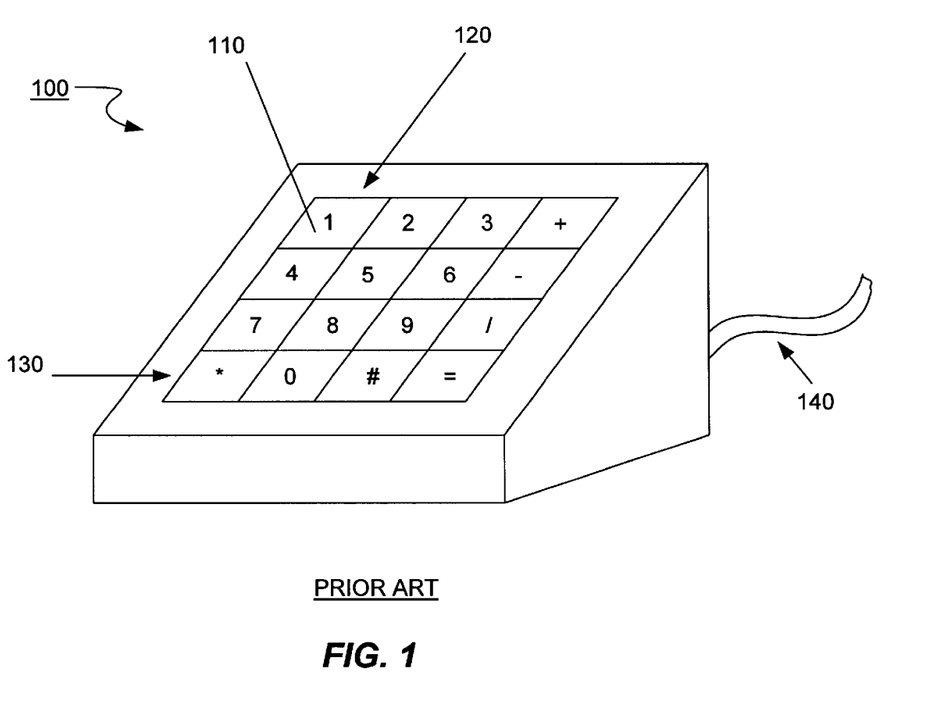
FIG. 1 illustrates a prior art input device as may be employed in using the method of the present invention, employing a number of finger activatable keys.

FIGS. 1 through 4 illustrate a prior art keyboard input device of the type for use with the preferred embodiment of present invention. Shown in FIG. 1 is a keyboard input device 100, which has a number of finger-activatable keys 110, each of which when depressed communicates to a computer a unit of information, in what is known as a key-press event. The keyboard 100 may contain any number of keys which are generally arranged in columns 120 and rows 130. In the preferred embodiment, keyboard 100 is a numbered keypad having keys representing the digits 0–9, and having additional function keys, arranged in a matrix of keys having four columns 120 and four rows 130. Keyboard 100 detects the key-press event and translates the key information for an external computer system (not shown) via a data transmission line 140.

Figure 2:
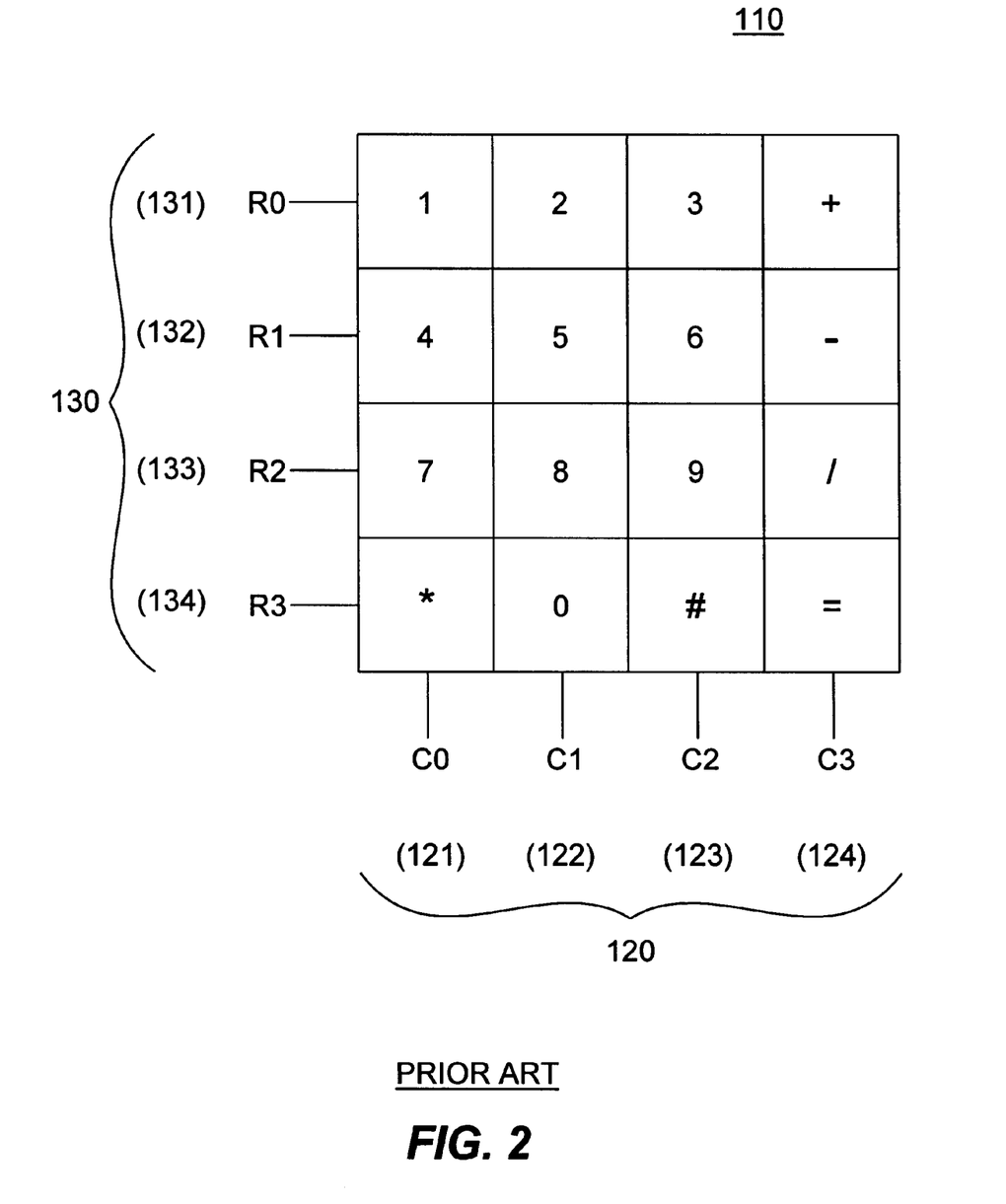
FIG. 2 is a simplified diagram of a matrix of finger activatable keys for use with the present invention.

FIG. 2 is a simplified diagram of a matrix of finger activatable keys 110. Shown for illustrative purposes is a four column-by-four row matrix of finger activatable keys 110. Column signal lines 121–124, designated as columns C0–C3, correspond to the columns of keys 110. Row signal lines 131–134, designated as rows R0–R3, correspond to the rows of keys 110 crosswise to the column signal lines.

Figure 3:
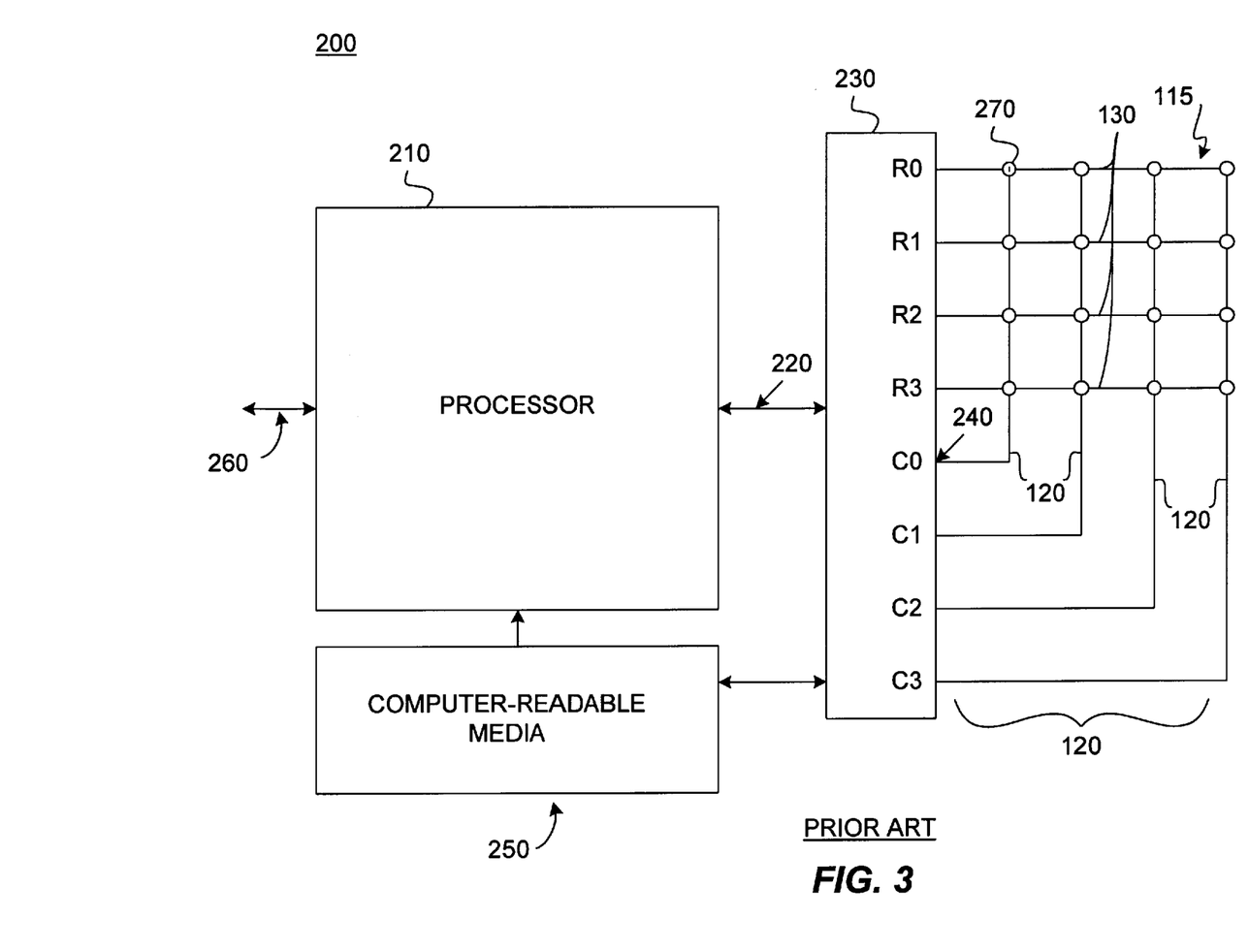
FIG. 3 is a simplified diagram of a keyboard circuit with a processor in a keyboard input device.

Every keyboard employs a processor function for detecting key-press events. FIG. 3 is a simplified diagram representative of a keyboard circuit 200 with a processor 210 as may be found inside the keyboard 100. The processor 210 contains signal generation circuitry as well as circuitry for signal detection. The processor 210 is connected to a signal data port 230 by data line 220, which can be either a serial or parallel bi-directional data line. Or, signal data port 230 may be part of the processor 210 in some keyboard systems. Signal data port 230 is connected to all the column signal lines 120 and row signal lines 130. The column signal lines 120 intersect with the row signal lines 130 to form a matrix of signal lines known as a scan matrix 115. Where each column signal line 120 and row signal line 130 intersect, there is a switch 270 which is, in turn, coupled to one of the finger-activatable keys 110.

When a key is depressed, the switch 270 is activated, causing an interconnection between the column signal line and row signal line connected to it. The interconnection causes a closed circuit, so that a signal forced onto the row signal line, for example, transfers onto the column signal line, thus changing the logic state of the column signal line. The processor 210, in response to a control program stored in a computer-readable media 250, such as a read-only memory (ROM), random access memory (RAM), will electronically monitor the scan matrix 115 for key-press events indicated by a change in the logic state of one of the column signal lines 120 when a signal is forced through the row signal lines 130, or likewise, by a change in the logic state of one of the row signal lines 130 when a signal is forced through the column signal lines 120.

The processor 210 and computer-readable media 250 may also be implemented in hardware, such as with an arithmetic logic circuit configured to perform the functions directed by the computer-readable media 250 and executed by the processor 210. Examples of a hardware implementation include a field programmable gate array (FPGA) integrated circuit, or an application specific integrated circuit (ASIC). These circuits may be configured with logic to detect a key-press event, and can be configured to perform the obfuscation routines of the present invention.

As discussed above, a key press event connects a column signal line to a row signal line. To detect a key press, the processor 210 places individual signals on the row signal lines 130 and scans the column signal lines 120 until one of the placed signals appears on a column signal line, indicating an interconnection at a switch 270. The detected column, and the row from which it received the signal, furnish sufficient information for the processor 210 to determine which key had been pressed. To detect a key's release, the process is repeated until no signal appears on the previously detected column.

Figure 4:
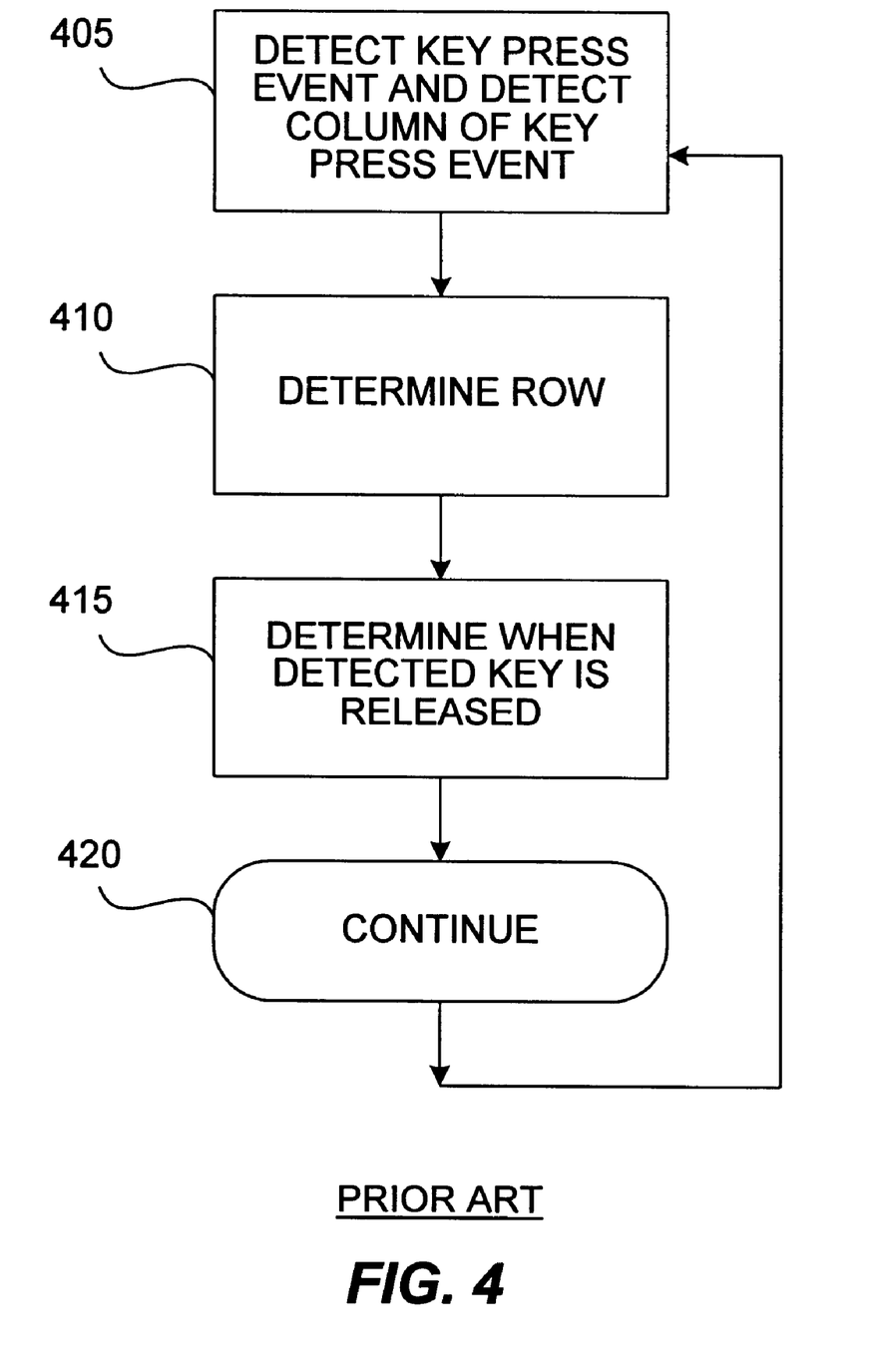
FIG. 4 illustrates a general prior art method of scanning a keyboard input device.

FIG. 4 is a highly simplified illustration of the technique generally used to scan a keyboard input device to detect a key-press event and its release. At step 405, the processor 210 (FIG. 3) will first detect a depressed key. This is done by having the processor successively apply, or "force," a signal onto a signal line in the key matrix 110, usually the row signal lines, for example. The processor 210 scans the column signal lines to detect from which column it receives a signal. The processor stores the detected column signal line information.

The next step 410 determines the row associated with a depressed key by applying or forcing a signal on selected rows until a column is detected, since, when the column is detected, the processor knows which row it had forced. Thus, having the column and row information, the processor 210 knows the key corresponding to the column and row. Moving to step 415, the processor 210 will continue monitoring the scan matrix 115 by repeating the process of successively and individually forcing the rows until the no column is detected having the signal. At this point, the processor 210 knows the associated key has been released. At step 420 the processor continues, by looking for the next key press event.

The problem in prior art keyboard input devices is that scanning methodology is predictable, and an external "attacker" can easily determine key-press information simply by tapping the row and column signals communicated between the processor 210 and the scan matrix 115. Prior-art attempts of obfuscate the signals employed in the method of scanning for key-press events have not achieved a desired level of security. Further, prior art obfuscation or security routines are predictable. What is needed is a keyboard device and method to sufficiently and effectively obfuscate scan signals in a key matrix, so that key-press events are not discernable by tapping the row and column signals or by an external monitoring means.

SUMMARY OF THE INVENTION

The present invention accomplishes its desired objects by providing a method, computer program product, and apparatus for obfuscating detection of activated keys in a keyboard input device. The input device is of the type having a key matrix including a number of finger activatable keys that, when depressed, cause an interconnection between one of a number of row signal lines and one of a number of column signal lines.

The present invention accomplishes its desired objects by broadly providing a method including the steps of: sequentially applying a signal to at least pairs of the row signal lines and at the same time randomly applying a duplicate signal to at least pairs of the column signal lines; scanning the column signal lines during each sequence to detect the signal appearing on a one of the column signal lines not having the duplicate signal applied thereto; continuing to sequentially apply the signal to at least pairs of the row signal lines and at the same time randomly applying the duplicate signal to at least one of the column signal lines; again scanning the column signal lines during each continuing sequence to detect the detected column signal line as having the signal in at least two sequences; and noting which of the at least pair of row signal lines have the signal applied thereto when said detected column signal line has the signal thereon to determine the row signal line interconnected to the column signal line of the depressed one of the number of finger activatable keys.

The present invention also accomplishes its desired objects by broadly providing a method including the further steps of: continuing to sequentially apply the signal to at least pairs of the row signal lines and at the same time randomly applying the duplicate signal to at least a one of the column signal lines other than the detected column signal line; again scanning the column signal lines to detect the one column signal line as having the signal in at least two sequences when not having the duplicate signal applied thereto; and again noting which of the at least pair of row signal lines have the signal applied thereto when the detected column signal line has the signal thereon, to confirm the determined row signal line interconnected to the detected column signal line of the depressed one of the number of finger activatable keys, the determined row signal line being common to the row signal lines noted.

The present invention further accomplishes its desired objects by broadly providing a method including the further steps of: repeating the step of continuing to sequentially apply the signal to at least pairs of the row signal lines and at the same time randomly applying the duplicate signal to at least pairs of the column signal lines; and scanning the column signal lines during each continuing sequence to monitor for an absence of the signal on the detected column signal line not having the duplicate signal applied thereto.

The present invention employs a conventional computer program product or an apparatus, as described above, and a keyboard input device to obfuscate detection of activated keys. The computer program product includes a processor to generate and detect signals, and a computer-readable media including: code that directs the signal generator to sequentially apply a signal to at least a pair of the row signal lines, while at the same time randomly apply a duplicate signal to at least pairs of the column signal lines; and code that directs the detector to scan the column signal lines during each sequence to detect the signal appearing on one of the column signal lines which is not applied by the signal generator; code that directs the signal generator to continue to sequentially apply the signal to at least pairs of row signal lines, while at the same time randomly apply the duplicate signal to at least one column signal line; code that directs the detector to again scan the column signal lines during each sequence to detect the detected column signal line having the signal in at least two sequences; and code that directs the processor to note which of the pair of row signal lines have the signal applied to them when the detected column signal line has on it a non-forced signal to determine the row signal line interconnected to the column signal line of the depressed finger activatable keys.

The present invention further provides an arithmetic logic circuit configured to accomplish all of the desired objects summarized above.

It is therefore an object of the present invention to provide a method for obfuscating detection of an activated key in a keyboard input device.

It is another object of the present invention to provide a computer program product disposed with the keyboard input device for obfuscating detection of an activated key.

It is yet another object of the present invention to provide an apparatus for obfuscating detection of an activated key.

These, together with the various ancillary objects and features which will become apparent to those skilled in the art as the following description proceeds, are attained by these novel methods and products, a preferred embodiment thereof shown with reference to the accompanying drawings, by way of example only, wherein:

DESCRIPTION OF THE SPECIFIC EMBODIMENTS

Turning again to FIG. 3, to scan the row signal lines R0–R3 (hereinafter "rows") and column signal lines C0–C3 (hereinafter "columns") according to the present invention, the processor 210 operates according to an obfuscated scanning method. The processor performs the method by applying predetermined sequences of ordered and random signals onto the columns 120 and rows 130 of the key matrix. The description of the obfuscated scanning method that follows is for exemplifying the preferred embodiment only; it will be understood that various alternative embodiments may be employed and contemplated by the teaching of the preferred embodiment.

The obfuscated scanning method has three phases: the Key Detect phase for detecting the column associated with a depressed key; the Key Scan phase to detect the row associated with the depressed key, and to confirm both row and column information; and the Key Release phase to detect when the depressed key has been released by the user.

The Key Detect and Key Release phases each also have a Debounce stage to confirm detection of a particular event, to minimize possible electrical skew, and to provide added obfuscation to the row and column signals.

In the preferred embodiment of the present invention, all three phases are further based upon a common scan routine, herein described in detail, so that each phase is externally indistinguishable from the others. The basic scan routine commonly employed is dependent upon, and tailored to, the number of rows and columns in the key matrix. The basic scan routine is continually repeated, and consists of N scan cycles, where N is a whole number equivalent to the number of rows in the key matrix. For purposes of example of the preferred embodiment, the following describes each one of the three phases in the context of the four-row by four-column key input device described above.

Scan Routine

Figure 5:
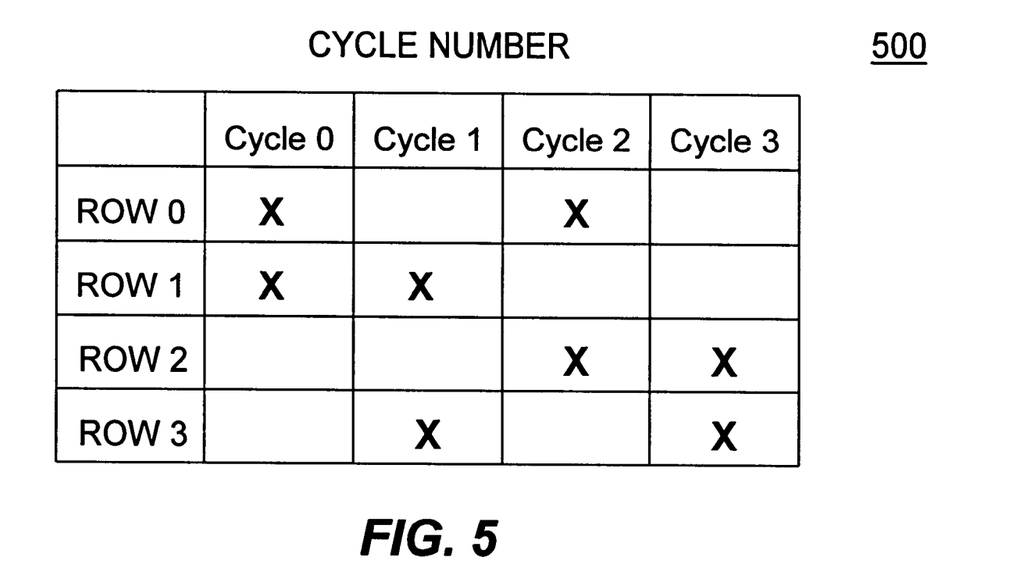
FIG. 5 illustrates a forcing pattern of row signal lines in a basic scan routine according to the preferred embodiment of the present invention.
Figure 6:
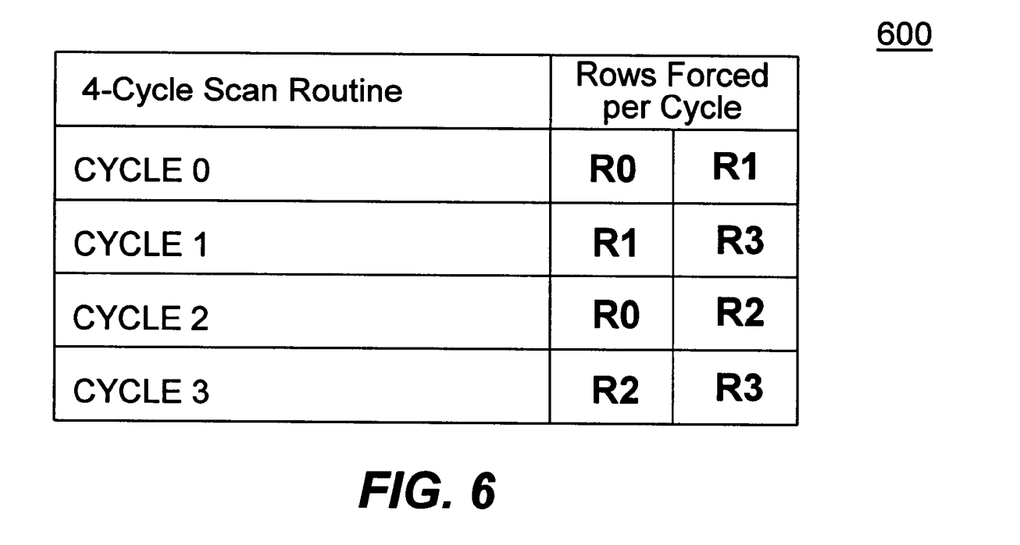
FIG. 6 illustrates the forcing pattern per scan routine cycle according to a basic scan routine in the preferred embodiment of the present invention.

In a four-by-four key matrix, the basic scan routine used for each of the three phases consists of four scan cycles. For each cycle, the processor sequentially forces a signal onto at least two rows, according to a predetermined pattern. FIG. 5 illustrates the basic scan routine for a 4-row key matrix according to the preferred embodiment. In each cycle, the processor forces onto two rows a signal, represented by an "X" in FIG. 5. FIG. 6 illustrates the same basic scan routine in a somewhat different manner by showing which rows are forced during each cycle, in accordance with FIG. 5. The sequential routine illustrated in FIGS. 5 and 6 is only one possible routine for a 4-row key matrix.

Thus, as FIGS. 5 and 6 show, the basic scan routine, according to the present invention, has a signal impressed on ROW 0 and ROW 1 during CYCLE 0. Next, in CYCLE 1, those signals are removed from ROWS 0 and 1 and impressed on ROW 1 and ROW 3. CYCLE 2 sees the signals impressed only on ROW 0 and ROW 2, and CYCLE 3 sees the signals appearing on ROW 2 and ROW 3.

The signals forced onto the rows may either be high or low with respect to the lines' null state. A low signal forced onto a row corresponding to a depressed key will result in a low signal being detected on the associated column. A high signal applied to the detected column while the key is still depressed will mask its association with the key. In the preferred embodiment, the signal being forced onto the rows is a low signal. The basic scan routine forms the foundation upon which all three phases are executed.

While the rows are sequentially and systematically forced, the basic scan routine changes slightly during each phase by randomly forcing the columns with either a duplicate ("low") or reverse ("high") signal depending on where in any of the three phases the process is being executed. The random forcing of signals onto the columns does, however, occur with a predetermined frequency. In the preferred embodiment for use with a four-by-four key matrix, for example, it is desirous to force the same number of columns as forced rows during each cycle. In an alternative preferred embodiment, the process may force the same number of columns as rows upon completion of all N cycles. Therefore, for each basic scan routine, each one of the columns has a 50% chance of being randomly forced in a pair by the processor during each scan cycle.

Key Detect Phase

Figure 7:
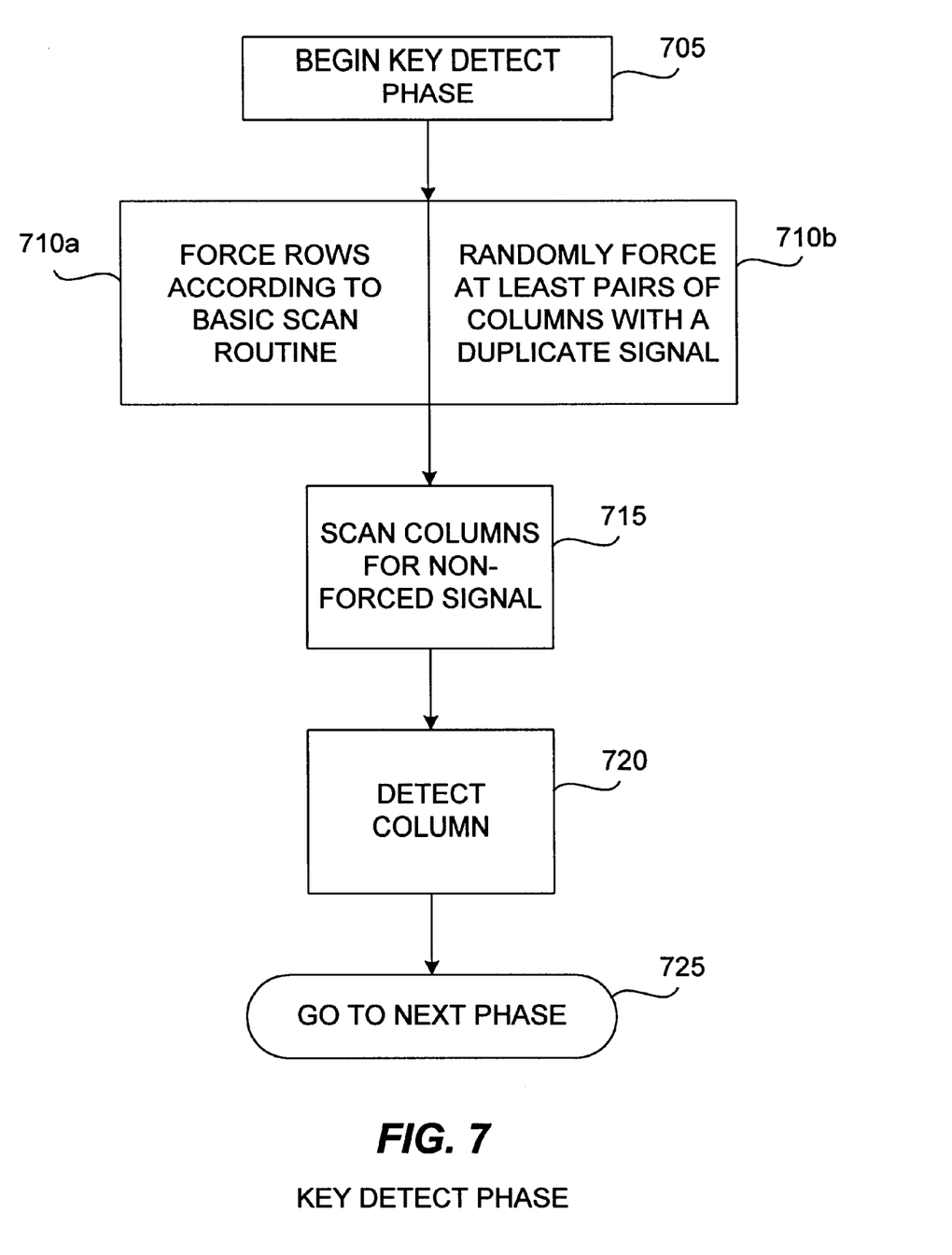
FIG. 7 shows a flow diagram of a Key Detect phase according to the preferred embodiment.

During the Key Detect phase, the processor continually performs the four-cycle scan routine until a key press event is detected. FIG. 7 shows a flow chart 700 of the Key Detect phase according to the preferred embodiment, beginning at step 705. For each cycle, shown in step 710a, predetermined pairs of rows are sequentially forced with a signal, while in concurrent step 710b two randomly-selected columns are forced with a duplicate signal. At step 715 the column signal lines are scanned for a signal that is not a forced column signal. If none is found, the routine of steps 710 and 715 are repeated until a column is detected (step 720) as having the signal at the end of a scan cycle at a particular point in time which the processor knew it was not then forcing on the column a duplicate signal.

At step 720 the detected column information, and information for the two rows then-forced at the same time the column was detected, will be saved in the processor for later use. The processor will continue the scan routine after a key press event has been detected to complete all four cycles of the particular scan routine during which column detection took place. At this point, the processor knows the column and has two candidate rows associated with the key press event. The processor will continue on to the Debounce stage at step 725, a time-delay routine which can often yield the particular row.

Key Detect Debounce

Figure 8:
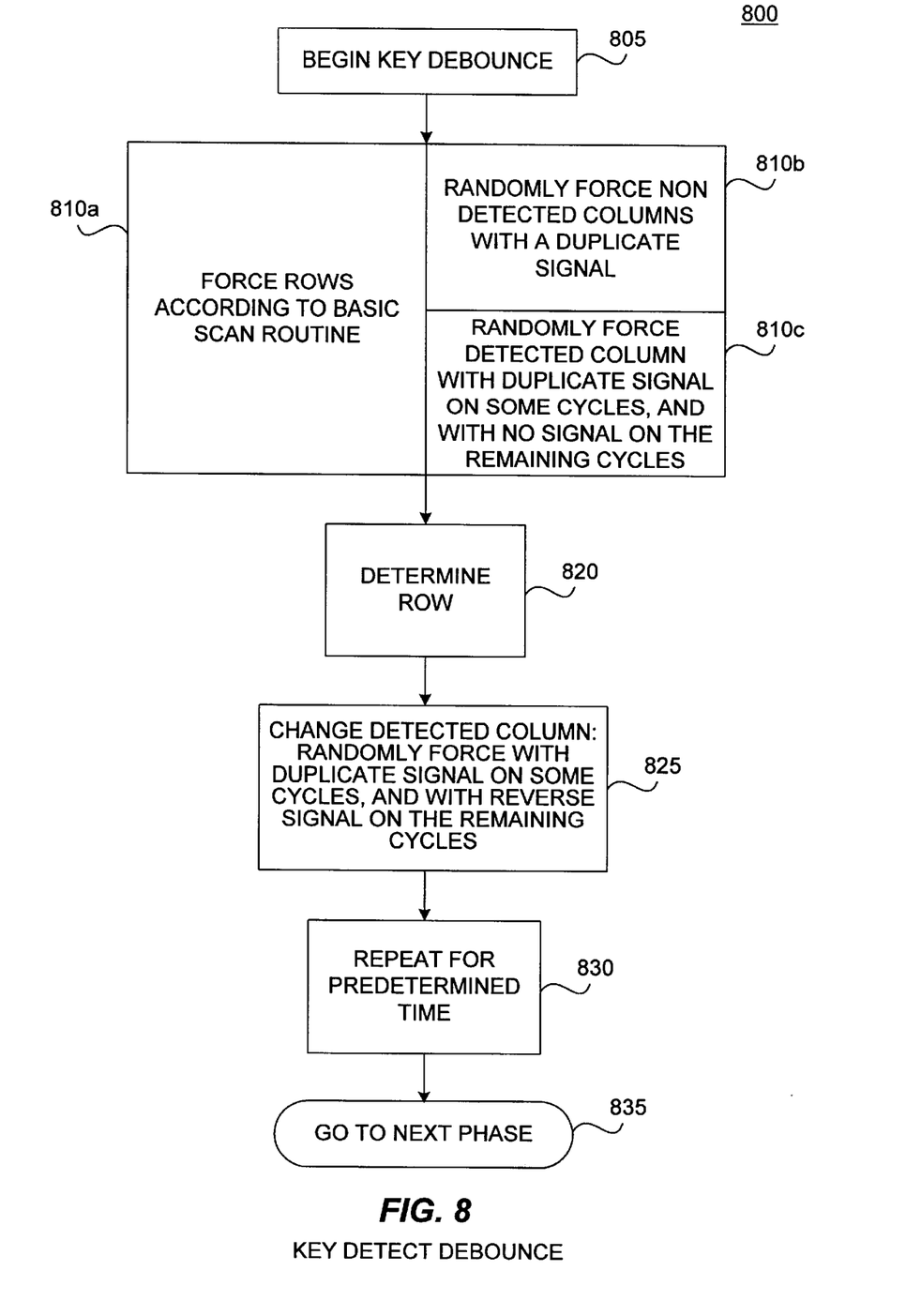
FIG. 8 shows a flow diagram of a Key Detect Debounce phase according to the preferred embodiment.

Debounce of the key press event is a time delay to be executed before entering the Key Scan phase. Generally, "debouncing" a key press means to repeat a key detection procedure in order to dampen electrical jitter which occurs at the switch contact between the row and column associated with a newly-depressed key, and which might skew detection. For purposes of the present invention however, debounce is performed primarily to confirm detection and to further obfuscate the scanning signals. The key press event is debounced by repeating the scan routine a predetermined number of times. FIG. 8 shows a flow chart of the Key Detect Debounce stage 800. For an 8 ms delay, for example, the processor will perform up to 20 basic scan routines (80 cycles) identical to step 710a at step 810a. At the same time the processor also randomly forces at least one of three non-detected columns with a duplicate signal. For the detected column, a more elaborate routine is needed.

The forcing of the detected column is based upon the particular cycle number of the basic scan routine during which it was detected. For illustration, the cycle during which the column was detected is herein known as the "detection cycle." In subsequent scan routines, during the detection cycle, the processor will force the detected column with an reverse signal during 50% of all 20 routines. During the one cycle of the basic scan routine that does not share any rows with the detection cycle, the processor will force the detected column with a duplicate signal 50% of the time for all 20 routines, all of which as shown in step 810c. In the two remaining cycles that share one row with the detection cycle, the processor will specifically not force the detected column. During these two scan cycles, the processor is looking again for the detected column to have the signal. Once detected, the row can be determined at step 820 by finding the one common forced row shared by each of the two cycles, after which determination the debounce stage changes at step 825.

At step 825, after both row and column are determined, during any scan cycle that the processor routinely forces the detected row, the processor will force the detected column with a reverse signal 50% of the time, in effect causing to it show as "null." During cycles that do not contain the detected row, the processor will force the column with a duplicate signal 50% of the time. The combination of duplicate and reverse signals masks the detected column from external monitoring. After the 20 scan routines are performed according to step 830, the key press debounce is completed, and at step 835 the processor moves to the Key Scan phase.

Key Scan Phase

Figure 9:
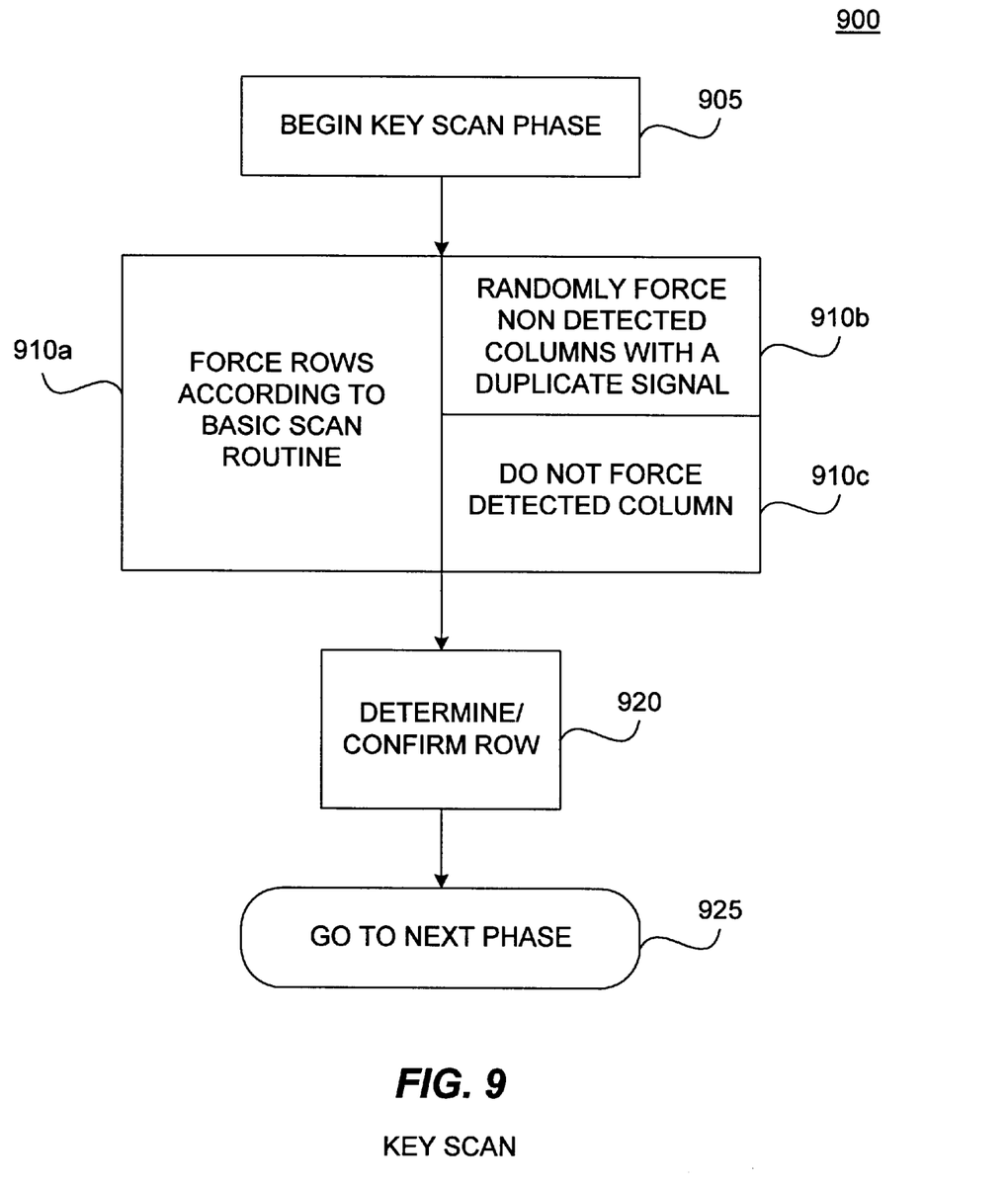
FIG. 9 shows a flow diagram of a Key Scan phase according to the preferred embodiment.

During the Key Scan phase, the processor confirms which row is associated with the depressed key. This confirmation is used since the processor already detected the depressed key's row during the debounce stage of the previous phase, but a double check may be needed in the case of sloppy key pressing by a user, or an error in the initial row and column detection. The Key Scan phase also serves to further obfuscate the signals on the key matrix.

FIG. 9 shows a flow diagram of the Key Scan phase which consists of a single basic scan routine at step 910a. The processor will concurrently force the three non-detected columns with a duplicate signal 50% of the time at step 910b, while not forcing the detected column, shown in concurrent step 910c. At each cycle, if the detected column is detected to have the signal, the row number information of the rows being forced are saved. After four scan cycles, at step 920 the saved information will yield again the row and column information associated with the depressed key.

If the processor finds that not enough information is present to determine the row, then the initial column detection was incorrect, and the processor will perform another scan of the key matrix. The processor will perform up to four scan routines with one predetermined column not being forced during each routine. For example, referring again to FIG. 3, in the first routine column C0 will not be forced, while the remaining three columns will be forced at a 50% probability. In the second routine, column C1 will not be forced, and so on.

Once a row and column are detected, the routine in which detection occurs completes all four cycles, and the remaining routines are not performed. If after all four routines there is no key press event detected, the processor will return to the Key Detect phase and search for another key press event. Otherwise, the detected key's information will be sent to the controller and the processor will move to the third and final phase at step 925.

Key Release

Figure 10:
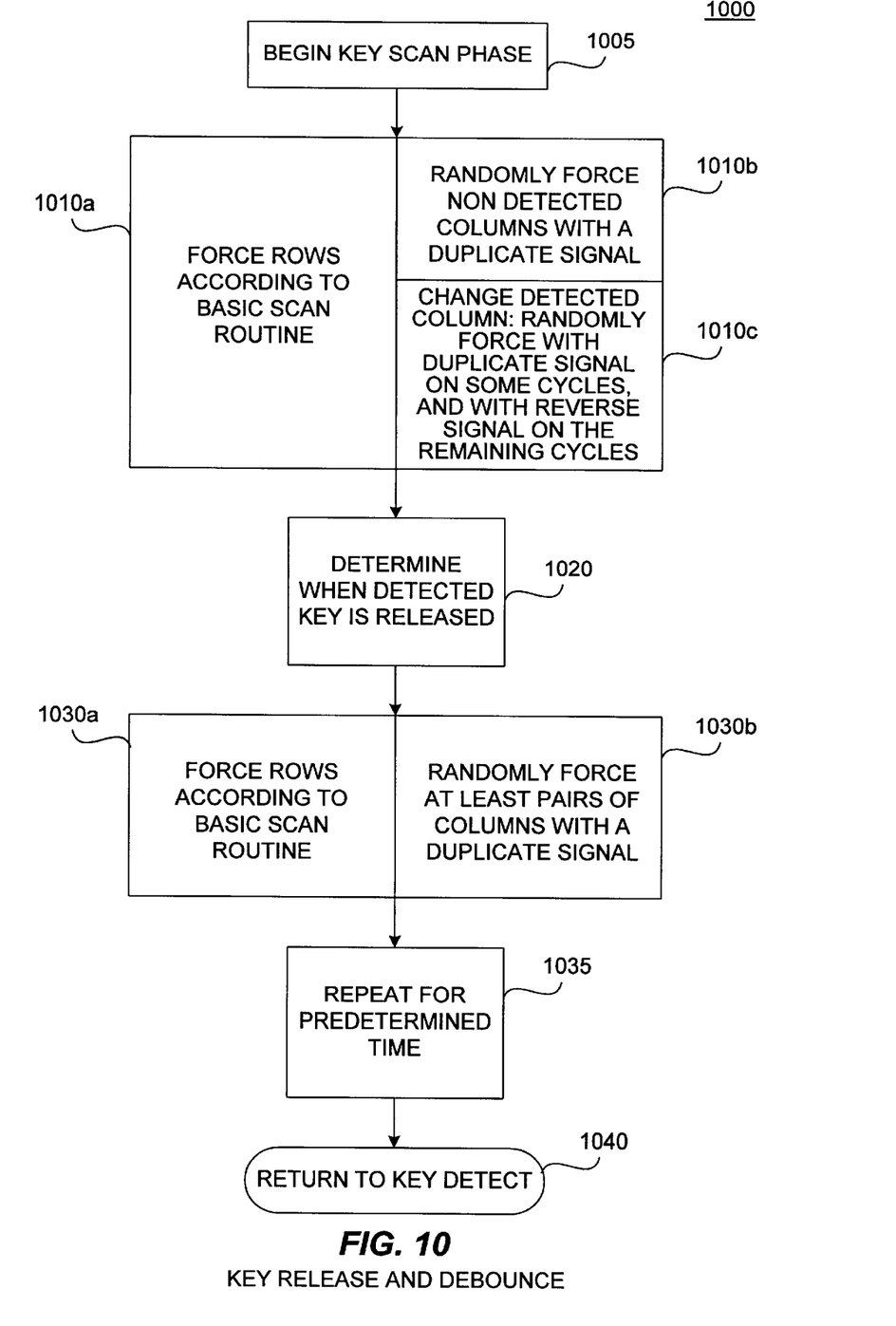
FIG. 10 shows a flow diagram of a Key Release and Key Release Debounce phase according to the preferred embodiment.

During Key Release phase, the keyboard processor is looking for the detected depressed key to be released. FIG. 10 shows a flow diagram of the Key Release stage, which repeats the scan routine found the Key Detect debounce stage after the row has been detected: at step 1010c on scan cycle numbers containing the detected row, the detected column is forced with the reverse signal 50% of the time; on the remaining two scan cycle numbers the detected column is forced with the duplicate signal 50% of the time; and the other three columns are forced with the duplicate signal 50% for all cycles at concurrent step 1010b. Thus, for each basic scan cycle 1010a, two columns are forced with either a duplicate signal or a reverse signal.

In a cycle where the processor forces the detected row, the detected column is monitored. If the detected column is detected to be in a non-forced and null state, then the key associated with the detected column has been released. Upon detecting this at step 1020, the processor will debounce the Key Release phase.

The Key Release debounce stage consists of a certain number of scan routines to achieve a desired delay, and is also illustrated in the flow diagram of FIG. 10. In the preferred embodiment, the processor runs 20 scan routines of step 1030a for a total 8 ms delay, similar to the Key Detect Debounce stage. During each scan cycle, the processor will randomly force two columns with the duplicate signal to the forced rows at step 1030b, with each column having a 50% chance of being forced during each cycle. Once the 20 routines have been completed by repeating step 1035, the processor will return to the Key Detect phase at step 1040 to detect the next key press event.

Timing

The three phases of the obfuscated scanning method combined have a total of five stages: Key Detect; Key Detect Debounce; Key Scan; Key Release; and Key Release Debounce. Each scan cycle may be programmed to occur once every 100 $\mu$s. Both debounce stages take 8ms to complete (20 routines×4 cycles/routine×100 $\mu$s/cycle). The timing for both the Key Detect and Key Release phases are indeterminate, depending chiefly on when a key press event occurs.

The preferred embodiment of the present invention performs fast enough to detect a key press, detect a key's release, and debounce twice for 8 ms delays. At the preferred forcing rate of 50%, the scan routine is able to obfuscate the key matrix while still performing the functions of detecting a key press event. Alternative embodiments of the present invention include: speeding up the rate at which the key matrix is scanned, thereby performing more routines in less time; or, adjusting the column forcing rate higher or lower to further mask the detection signals on the columns.

While a full and complete disclosure of the invention has been made, it will become evident to those skilled in this art that various alternatives and modifications can be made to various aspects of the invention without departing from the true scope of the claims which follow. For example, there has been disclosed a keyboard input device having four rows by four columns. It should be evident to those skilled in this art that the concept can be carried further to keyboard input devices having many more keys and thus more rows and columns. Further, the timing of the scan routine may be accelerated, or the forcing rate of the columns may be adjusted to a specific application.

What is claimed is:

1. In an input device including a key matrix having a number of activatable keys that, when activated, cause an interconnection between a corresponding one of a number of row signal lines and a corresponding one of a number of column signal lines, a method of obfuscating detection of activation of the keys, the method including:

a first phase including the steps of,
 (a) during each of a plurality of first scan cycles, applying a signal to at least two associated ones of the row signal lines and simultaneously applying a duplicate signal to at least two randomly selected ones of the column signal lines,
 (b) scanning the column signal lines during each of the first scan cycles to detect a first signal on a detected one of the column signal lines not having the duplicate signal applied thereto upon a first detection one of the first scan cycles during which at least two associated candidate ones of the row signal lines have signals applied thereto, and
 (c) storing information indicative of said detected column signal line and said candidate row signal lines;

a second phase including the steps of,
 (d) during each of a plurality of second scan cycles, applying a signal to at least two associated ones of the row signal lines and simultaneously applying a duplicate signal to a randomly selected one of the column signal lines other than said detected column signal line,
 (e) scanning the column signal lines during each of at least two shared row ones of the second scan cycles, wherein a corresponding common one of said candidate row signal lines has a signal applied thereto during each of said shared row scan cycles, to detect a second signal on said detected column signal line during a second detection one of said shared row scan cycles, and (f) determining a detected row signal line as a row signal line having a signal applied thereto during each of said first and second detection cycles.

2. The method of claim 1 further comprising:

a third phase including the steps of, (g) during each of a plurality of third scan cycles applying a signal to at least two of the row signal lines and simultaneously selectively applying a duplicate signal to at least one of the column signal lines other than said detected column signal line, wherein the selective application of the signal is performed in accordance with a predetermined probability, (h) scanning the column signal lines during each of the third scan cycles to detect a third signal on said detected column signal line upon a third detection one of the third scan cycles during which at least two associated confirm candidate ones of the row signal lines have signals applied thereto, (i) storing information indicative of said confirm candidate row signal lines, (j) further scanning the column signal lines during each third scan cycle following said third detection scan cycle to detect a fourth signal on said detected column signal line occurring upon a fourth detection one of the third scan cycles during which at least two associated confirm candidate ones of the row signal lines have signals applied thereto, wherein a corresponding common one of said confirm candidate row signal lines has a signal applied thereto during each of said third and fourth detection scan cycles, and (k) confirming said detected row signal line if said detected row signal line has a signal applied thereto during each of said first, second, third and fourth detection cycles.

3. The method of claim 2 wherein said key scan phase further includes the steps of:

repeating the step (g) of during each of the third scan cycles, applying a signal to at least two of the row signal lines; and scanning the column signal lines during each of said third scan cycles to monitor for an absence of a signal on said detected column signal line.

4. The method of claim 1 wherein the step (d) of during each of the second scan cycles, applying a signal to at least two associates ones of the row signal lines and simultaneously applying a duplicate signal to a randomly selected one of the column signal lines other than said detected column signal line further includes the step of:

randomly applying to said detected column signal line a reverse signal during at least one of the second scan cycles.

5. The method of claim 1 or 4 further including repeating the step (d) of during each of the second scan cycles, applying a signal to at least two associates ones of the row signal lines and simultaneously applying a duplicate signal to a randomly selected one of the column signal lines other than said detected column signal line, while randomly applying a reverse signal to said detected column signal line.

6. The method of claim 3 further includes repeating, for a predetermined time, the step (g) of during each of the third scan cycles applying a signal to at least two associated ones of the row signal lines.

7. The method of claim 1 wherein said step (d) of during each of the second scan cycles, applying a signal to at least two associated ones of the row signal lines and simultaneously applying a duplicate signal to a randomly selected one of the column signal lines other than said detected column signal line further includes randomly applying a duplicate signal to at least one of the column signal lines other than said detected column signal line, and sequentially applying to said detected column signal line a duplicate signal and a reverse signal.

8. The method of claim 1 wherein said first phase includes performing said steps (a) and (b) for at least a plurality of N of the first scan cycles wherein N is a whole number corresponding to the number of row signal lines.

9. The method of claim 4 or 7 wherein said signal is a low signal, and wherein said reverse signal is a high signal.

10. In an input device of the type including a key matrix having a number of activatable keys that, when activated, cause an interconnection between a corresponding one of a plurality of row signal lines and a corresponding one of a plurality of column signal lines, a computer program product for obfuscating detection of activation of the keys, the product comprising:

a processor having a data port coupled to said key matrix for providing signals to said key matrix and for detecting signals from said key matrix;

a computer-readable media coupled to the processor including:

first code that directs the processor to a perform a first phase, said first code including, (a) code that directs the processor, during each of a plurality of first scan cycles, to apply a signal to at least two associated ones of the row signal lines and simultaneously applying a duplicate signal to at least two randomly selected ones of the column signal lines, (b) code that directs the processor to scan the column signal lines during each of the first scan cycles to detect a first signal on a detected one of the column signal lines not having the duplicate signal applied thereto upon a first detection one of the first scan cycles during which at least two associated candidate ones of the row signal lines have signals applied thereto, and (c) code that directs the processor to store information indicative of said detected column signal line and said candidate row signal lines; and second code that directs the processor to a perform a first phase, said second code including, (d) code that directs the processor to during each of a plurality of second scan cycles, applying a signal to at least two associated ones of the row signal lines and simultaneously applying a duplicate signal to a randomly selected one of the column signal lines other than said detected column signal line, (e) code that directs the processor to scan the column signal lines during each of at least two shared row ones of the second scan cycles, wherein a corresponding common one of said candidate row signal lines has a signal applied thereto during each of said shared row scan cycles, to detect a second signal on said detected column signal line during a second detection one of said shared row scan cycles, and (f) code that directs the processor to determine a detected row signal line as a row signal line having a signal applied thereto during each of said first and second detection cycles.

11. The computer program product of 10 wherein the computer-readable media also includes:
  third code that directs the processor to a perform a first phase, said second code including,
    (g) code that directs the processor during each of a plurality of third scan cycles to apply a signal to at least two of the row signal lines and simultaneously selectively applying a duplicate signal to at least one of the column signal lines other than said detected column signal line, wherein the selective application of the signal is performed in accordance with a predetermined probability,
    (h) code that directs the processor to scan the column signal lines during each of the third scan cycles to detect a third signal on said detected column signal line upon a third detection one of the third scan cycles during which at least two associated confirm candidate ones of the row signal lines have signals applied thereto,
    (i) code that directs the processor to store information indicative of said confirm candidate row signal lines,
    (j) code that directs the processor to further scan the column signal lines during each third scan cycle following said third detection scan cycle to detect a fourth signal on said detected column signal line occurring upon a fourth detection one of the third scan cycles during which at least two associated confirm candidate ones of the row signal lines have signals applied thereto, wherein a corresponding common one of said confirm candidate row signal lines has a signal applied thereto during each of said third and fourth detection scan cycles, and
    (k) code that directs the processor to confirm said detected row signal line if said detected row signal line has a signal applied thereto during each of said first, second, third and fourth detection cycles.

12. The computer program product of 11 wherein the process further includes:
  code that directs the processor to repeat during each of the third scan cycles, applying a signal to at least two of the row signal lines; and
  code that directs the processor to scan the column signal lines during each of said third scan cycles to monitor for an absence of a signal on said detected column signal line.

13. The computer program product of 10 wherein the code that directs the processor during each of the second scan cycles, to apply a signal to at least two associates ones of the row signal lines and simultaneously apply a duplicate signal to a randomly selected one of the column signal lines other than said detected column signal line also includes:
  code that directs the processor to randomly apply to said detected column signal line a reverse signal during at least one of the second scan cycles.

14. The computer program product of 10 or 13 wherein the computer-readable media also includes:
  code that directs the processor to continue during each of the second scan cycles, to apply a signal to at least two associates ones of the row signal lines and simultaneously applying a duplicate signal to a randomly selected one of the column signal lines other than said detected column signal line, while randomly applying a reverse signal to said detected column signal line.

15. The computer program product of 12 wherein the computer-readable media also includes:
  code that directs the processor to repeat, for a predetermined time, applying a signal to at least two associated ones of the row signal lines during each of the third scan cycles.

16. The computer program product of 10 wherein the computer-readable media also includes:
  code that directs the processor to randomly apply a duplicate signal to at least one of the column signal lines other than said detected column signal line, and to apply to said detected column signal line the duplicate signal and a reverse signal.

17. The computer program product of claim 10 wherein said first phase includes performing said steps (a) and (b) for at least a plurality of N of the first scan cycles, wherein N is a whole number corresponding to the number of row signal lines.

18. The computer program product of claim 13 or 16 wherein said signal is a low signal, and wherein said reverse signal is a high signal.

19. An apparatus for obfuscating detection of activation of a number of keys of an input device, the apparatus including:
  a key matrix including a number of row signal lines, a number of column signal lines, and a number of activatable keys that, when activated, cause an interconnection between a corresponding one of the row signal lines and a corresponding one of the column signal lines; and
  an arithmetic logic circuit configured to perform a process of obfuscating detection of activation of the keys, the method including:
    a first phase including the steps of,
      (a) during each of a plurality of first scan cycles, applying a signal to at least two associated ones of the row signal lines and simultaneously applying a duplicate signal to at least two randomly selected ones of the column signal lines,
      (b) scanning the column signal lines during each of the first scan cycles to detect a first signal on a detected one of the column signal lines not having the duplicate signal applied thereto upon a first detection one of the first scan cycles during which at least two associated candidate ones of the row signal lines have signals applied thereto, and
      (c) storing information indicative of said detected column signal line and said candidate row signal lines;
    a second phase including the steps of,
      (d) during each of a plurality of second scan cycles, applying a signal to at least two associated ones of the row signal lines, and simultaneously applying a duplicate signal to a randomly selected one of the column signal lines other than said detected column signal line,
      (e) scanning the column signal lines during each of at least two shared row ones of the second scan cycles, wherein a corresponding common one of said candidate row signal lines has a signal applied thereto during each of said shared row scan cycles, to detect a second signal on said detected column signal line during a second detection one of said shared row scan cycles, and
      (f) determining a detected row signal line as a row signal line having a signal applied thereto during each of said first and second detection cycles.

20. The apparatus of claim 19 wherein said arithmetic logic circuit is further configured to perform a third phase of the process of obfuscating detection, the third phase including the steps of:

(g) during each of a plurality of third scan cycles applying a signal to at least two of the row signal lines and simultaneously selectively applying a duplicate signal to at least one of the column signal lines other than said detected column signal line, wherein the selective application of the signal is performed in accordance with a predetermined probability, (h) scanning the column signal lines during each of the third scan cycles to detect a third signal on said detected column signal line upon a third detection one of the third scan cycles during which at least two associated confirm candidate ones of the row signal lines have signals applied thereto, (i) storing information indicative of said confirm candidate row signal lines, (j) further scanning the column signal lines during each third scan cycle following said third detection scan cycle to detect a fourth signal on said detected column signal line occurring upon a fourth detection one of the third scan cycles during which at least two associated confirm candidate ones of the row signal lines have signals applied thereto, wherein a corresponding common one of said confirm candidate row signal lines has a signal applied thereto during each of said third and fourth detection scan cycles, and (k) confirming said detected row signal line if said detected row signal line has a signal applied thereto during each of said first, second, third and fourth detection cycles.

21. The apparatus of claim 19 wherein said arithmetic logic circuit is further configured to:

repeat the step (g) of during each of the third scan cycles, applying a signal to at least two of the row signal lines, and scanning the column signal lines during each of said third scan cycles to monitor for an absence of a signal on said detected column signal line.

22. In an input device including a key matrix having a number of activatable keys that, when activated, cause an interconnection between a corresponding one of a number of row signal lines and a corresponding one of a number of column signal lines, a process of obfuscating detection of activation of the keys, the process including:

a key detect phase including the steps of, (a) during each of a plurality of first scan cycles, applying a signal to at least two associated ones of the row signal lines and simultaneously applying a duplicate signal to at least two randomly selected ones of the column signal lines, (b) scanning the column signal lines during each of the first scan cycles to detect a first signal on a detected one of the column signal lines not having the duplicate signal applied thereto upon a first detection one of the first scan cycles during which at least two associated candidate ones of the row signal lines have signals applied thereto, and (c) storing information indicative of said detected column signal line and said candidate row signal lines; and a key detect debounce phase including the steps of, (d) during each of a plurality of second scan cycles, applying a signal to at least two associated ones of the row signal lines and simultaneously applying a duplicate signal to a randomly selected one of the column signal lines other than said detected column signal line, (e) scanning the column signal lines during each of at least two shared row ones of the second scan cycles, wherein a corresponding common one of said candidate row signal lines has a signal applied thereto during each of said shared row scan cycles, to detect a second signal on said detected column signal line during a second detection one of said shared row scan cycles, and (f) determining a detected row signal line as a row signal line having a signal applied thereto during each of said first and second detection cycles.

23. In an input device as recited in claim 22 further comprising a third phase including the steps of:

(g) during each of a plurality of third scan cycles, applying a signal to at least two of the row signal lines and simultaneously selectively applying a duplicate signal to at least one of the column signal lines other than said detected column signal line, wherein selective application of the signal is performed in accordance with a predetermined probability;

(h) scanning the column signal lines during each of the third scan cycles to detect a third signal on said detected column signal line upon a third detection one of the third scan cycles during which at least two associated confirm candidate ones of the row signal lines have signals applied thereto;

(i) storing information indicative of said confirm candidate row signal lines;

(j) further scanning the column signal lines during each third scan cycle following said third detection cycle to detect a fourth signal on said detected column signal line occurring upon a fourth detection one of the third scan cycles during which at least two associated confirm candidate ones of the row signal lines have signals applied thereto, wherein a corresponding common one of said confirm candidate row signal lines has a signal applied thereto during each of said third and fourth detection scan cycles; and (k) confirming said detected row signal line if said detected row signal line has a signal applied thereto during each of said first, second, third and fourth detection cycles.

24. In an input device as recited in claim 22 wherein said step (d) of said key detect debounce phase further includes randomly applying to said detected column signal line a reverse signal during at least one of the second scan cycles.

25. In an input device as recited in claim 22 wherein said key detect debounce phase further includes repeating said step (d) while randomly applying a reverse signal to said detected column signal line.

26. In an input device as recited in claim 22 wherein said first phase includes performing said steps (a) and (b) for at least a plurality of N of the first scan cycles wherein N is a whole number corresponding to the number of the row signal lines in the key matrix.

27. In an input device as recited in claim 24 wherein said signal is a low signal, and wherein said reverse signal is a high signal.

* * * * *

UNITED STATES PATENT AND TRADEMARK OFFICE
CERTIFICATE OF CORRECTION

PATENT NO.     : 6,259,435 B1
DATED          : July 10, 2001
INVENTOR(S)    : Donald P. Matthews, Jr.

It is certified that error appears in the above-identified patent and that said Letters Patent is hereby corrected as shown below:

<u>Title page,</u>
U.S PATENT DOCUMENTS, reads:
"3,836,726 * 9/1974  Well et al. ................................. 179/41" should read --
3,836,726 * 9/1974  Wells et al. ................................ 179/41 --;

<u>Column 9, claim 6,</u>
Line 66, reads, "scan cycles applying a signal to at least two associated ones" should read -- scan cycles, applying a signal to at least two associated ones --;

Signed and Sealed this

Twenty-sixth Day of February, 2002

Attest:

Attesting Officer

JAMES E. ROGAN
Director of the United States Patent and Trademark Office